(12) United States Patent
Van Phan et al.

(10) Patent No.: US 12,445,931 B2
(45) Date of Patent: Oct. 14, 2025

(54) PATH SWITCHING IN USER EQUIPMENT TO USER EQUIPMENT RELAY

(71) Applicant: NOKIA TECHNOLOGIES OY, Espoo (FI)

(72) Inventors: Vinh Van Phan, Oulu (FI); Ling Yu, Kauniainen (FI); Faranaz Sabouri-Sichani, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 518 days.

(21) Appl. No.: 17/963,043

(22) Filed: Oct. 10, 2022

(65) Prior Publication Data

US 2024/0121698 A1  Apr. 11, 2024

(51) Int. Cl.
*H04W 40/08* (2009.01)
*H04W 40/12* (2009.01)
*H04W 40/34* (2009.01)

(52) U.S. Cl.
CPC .......... *H04W 40/08* (2013.01); *H04W 40/12* (2013.01); *H04W 40/34* (2013.01)

(58) Field of Classification Search
None
See application file for complete search history.

(56) References Cited

U.S. PATENT DOCUMENTS

2021/0021536 A1* 1/2021 Ganesan ............... H04L 1/1893
2021/0336728 A1* 10/2021 Selvanesan .......... H04L 1/1896
2022/0039079 A1* 2/2022 Yu ......................... H04L 1/1812
2022/0052788 A1* 2/2022 Paladugu ............. H04L 1/1893
2022/0103997 A1 3/2022 Kang et al.
2022/0264530 A1 8/2022 Elshafie et al.
2023/0300815 A1* 9/2023 Li ........................ H04L 1/1854

OTHER PUBLICATIONS

3GPP TS 38.212 V.16.2.0 (Jun. 2020), 3rd Generation Partnership Project; Technical Specification Group Radio Access Network; NR; Multiplexing and channel coding (Release 16), 151 pages.
LG Electronics, "Revised WID on NR sidelink relay enhancements", 3GPP TSG RAN Meeting #96, Budapest, Hungary, Jun. 6-9, 2022, RP-221262, 6 pages.
International Search Report and Written Opinion dated Dec. 5, 2023, corresponding to International Patent Application No. PCT/IB2023/059360.

* cited by examiner

*Primary Examiner* — Brian S Roberts
(74) *Attorney, Agent, or Firm* — Carter, DeLuca & Farrell LLP

(57) ABSTRACT

A method may include monitoring, by a source user equipment communicating with a destination user equipment by an indirect communication path via a relay user equipment, sidelink control information from the relay user equipment. The method may also include determining a first set of conditions and a second set of conditions based on the sidelink control information received from the relay user equipment. The method may further include transmitting, when the first set of conditions is met, at least one of a first sidelink message to the destination user equipment according to a first pattern, or a second sidelink message to the relay user equipment according to a second pattern. In addition, the method may include monitoring a sidelink feedback from the destination user equipment to the relay user equipment when the second set of conditions is met according to a third pattern.

1 Claim, 7 Drawing Sheets

PATH SWITCHING IN USER EQUIPMENT TO USER EQUIPMENT RELAY

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for path switching in a user equipment to user equipment (U2U) relay.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, and/or fifth generation (5G) radio access technology or NR access technology. 5G wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include monitoring, by a source user equipment communicating with a destination user equipment by an indirect communication path via a relay user equipment, sidelink control information from the relay user equipment. The method also includes determining a first set of conditions and a second set of conditions based on the sidelink control information received from the relay user equipment. The method further includes transmitting, when the first set of conditions is met, at least one of a first sidelink message to the destination user equipment according to a first pattern, or a first sidelink message to the destination user equipment according to a first pattern. In addition, the method includes monitoring a sidelink feedback from the destination user equipment to the relay user equipment when the second set of conditions is met according to a third pattern.

Other example embodiments may be directed to an apparatus. The apparatus may include at least one processor and at least one memory including computer program code. The at least one memory and computer program code may also be configured to, with the at least one processor, cause the apparatus at least to monitor sidelink control information from the relay user equipment. According to certain example embodiments, the apparatus may be in communication with a destination user equipment by an indirect communication path via a relay user equipment. The apparatus may also be caused to determine a first set of conditions and a second set of conditions based on the sidelink control information received from the relay user equipment. The apparatus may further be caused to transmit, when the first set of conditions is met, at least one of a first sidelink message to the destination user equipment according to a first pattern, or a second sidelink message to the relay user equipment according to a second pattern. In addition, the apparatus may be caused to monitor a sidelink feedback from the destination user equipment to the relay user equipment when the second set of conditions is met according to a third pattern.

Other example embodiments may be directed to an apparatus. The apparatus may include means for monitoring sidelink control information from the relay user equipment. According to certain example embodiments, the apparatus may be in communication with a destination user equipment by an indirect communication path via a relay user equipment. The apparatus may also include means for determining a first set of conditions and a second set of conditions based on the sidelink control information received from the relay user equipment. The apparatus may further include means for transmitting, when the first set of conditions is met, at least one of a first sidelink message to the destination user equipment according to a first pattern, or a second sidelink message to the relay user equipment according to a second pattern. In addition, the apparatus may include means for monitoring a sidelink feedback from the destination user equipment to the relay user equipment when the second set of conditions is met according to a third pattern.

In accordance with other example embodiments, a non-transitory computer readable medium may be encoded with instructions that may, when executed in hardware, perform a method. The method may include monitoring, by a source user equipment communicating with a destination user equipment by an indirect communication path via a relay user equipment, sidelink control information from the relay user equipment. The method also includes determining a first set of conditions and a second set of conditions based on the sidelink control information received from the relay user equipment. The method further includes transmitting, when the first set of conditions is met, at least one of a first sidelink message to the destination user equipment according to a first pattern, or a first sidelink message to the destination user equipment according to a first pattern. In addition, the method includes monitoring a sidelink feedback from the destination user equipment to the relay user equipment when the second set of conditions is met according to a third pattern.

Other example embodiments may be directed to a computer program product that performs a method. The method may include monitoring, by a source user equipment communicating with a destination user equipment by an indirect communication path via a relay user equipment, sidelink control information from the relay user equipment. The method also includes determining a first set of conditions and a second set of conditions based on the sidelink control information received from the relay user equipment. The method further includes transmitting, when the first set of conditions is met, at least one of a first sidelink message to the destination user equipment according to a first pattern, or a first sidelink message to the destination user equipment according to a first pattern. In addition, the method includes monitoring a sidelink feedback from the destination user equipment to the relay user equipment when the second set of conditions is met according to a third pattern.

Other example embodiments may be directed to an apparatus that may include circuitry configured to monitor sidelink control information from the relay user equipment. In certain example embodiments, the apparatus may be in communication with a destination user equipment by an indirect communication path via a relay user equipment. The apparatus may also include circuitry configured to determine a first set of conditions and a second set of conditions based on the sidelink control information received from the relay user equipment. The apparatus may further include circuitry configured to transmit, when the first set of conditions is met, at least one of a first sidelink message to the destination user equipment according to a first pattern, or a second sidelink message to the relay user equipment according to a second pattern. In addition, the apparatus may include circuitry configured to monitor a sidelink feedback from the destination user equipment to the relay user equipment when the second set of conditions is met according to a third pattern.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for path switching in a U2U relay. For instance, certain example embodiments may be directed to providing support for a path switch from an indirect path to a direct path in a sidelink-based (SL-based) U2U relay.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Figure 1A:
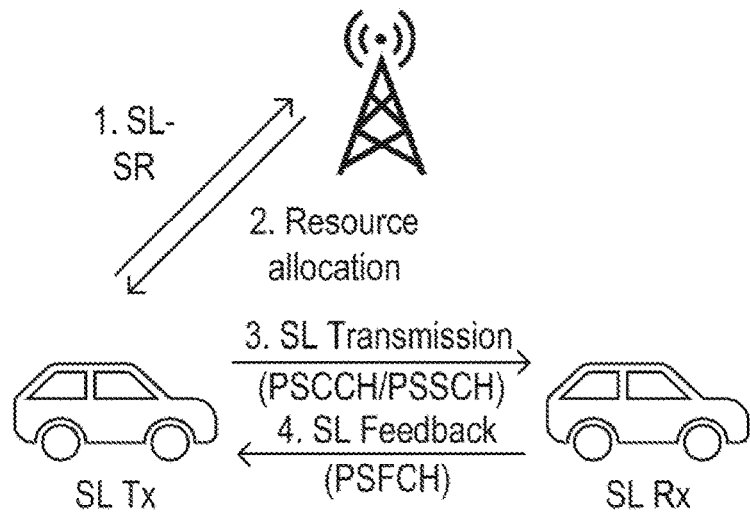
FIG. 1(a) illustrates an example new radio (NR) sidelink (SL) resource allocation in mode 1.
Figure 1B:
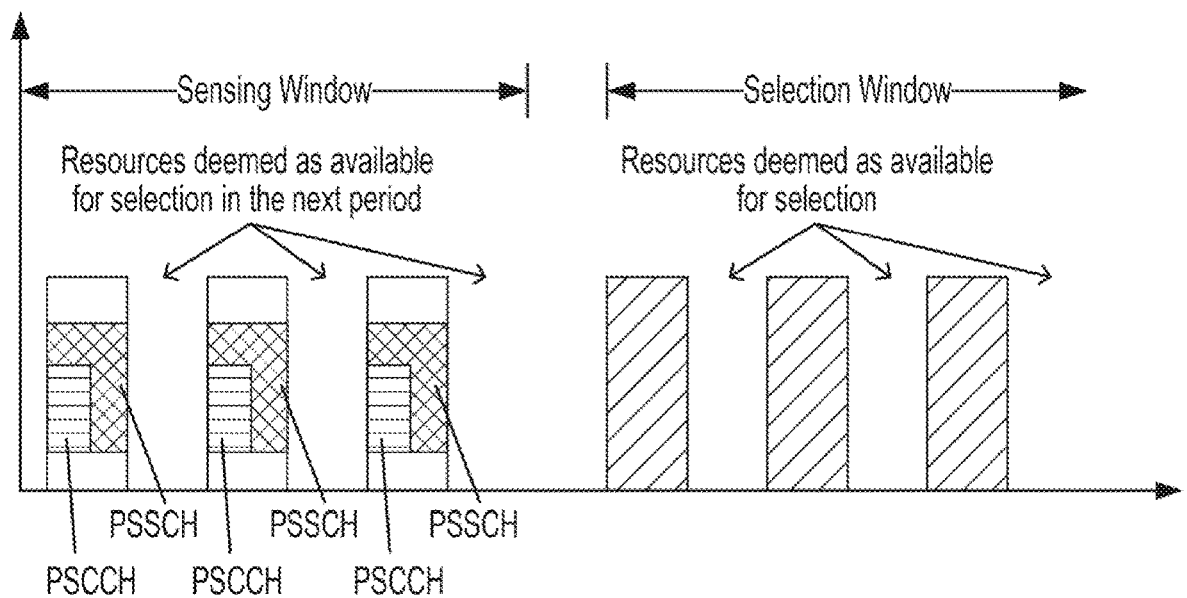
FIG. 1(b) illustrates an example NR SL resource allocation mode 2.

As described in the technical specifications of 3$^{rd}$ Generation Partnership Project (3GPP), SL communication has been designed to facilitate a UE to communicate with other nearby UE(s) via direct SL communication. 3GPP also specifies two resource allocation modes, and an SL transmitter (Tx) UE that is configured with one of the modes to perform NR SL transmissions. These modes are denoted as NR SL mode 1 and NR SL mode 1. For instance, FIG. 1(a) illustrates an example NR SL resource allocation in mode 1, and FIG. 1(b) illustrates an example NR SL resource allocation in mode 2. In mode 1, a SL transmission resource may be assigned (scheduled) by the network (NW) to the SL Tx UE, while in a SL Tx UE in mode 2 autonomously selects its SL transmission resources.

In mode 1, the gNB may be responsible for the SL resource allocation, and the configuration and operation may be similar to the one over the Uu interface shown in FIG. 1(a). As illustrated in FIG. 1(b), in mode 2, the SL UEs may autonomously perform resource selection with the aid of a sensing procedure. For example, a SL Tx UE in NR SL mode 2 may first perform a sensing procedure over the configured SL transmission resource pool(s) so that the SL Tx UE may obtain the knowledge of the reserved resource(s) by other nearby SL Tx UE(s). Based on the knowledge, obtained from sensing, the SL Tx UE may select resource(s) from the available SL resources, accordingly. In order for a SL UE to perform sensing and obtain the necessary information to receive a SL transmission, the SL UE may decode sidelink control information (SCI) from other SL Tx UEs in proximity of the SL UE.

The SCI may follow a 2-stage SCI structure that may support the size difference between the SCIs needed for various NR-vehicle to everything (V2X) SL service types (e.g., broadcast, groupcast, and unicast). For instance, the first stage SCI with SCI format 1-A may be carried by physical sidelink control channel (PSCCH), and may include information to enable sensing operations, and information needed to determine resource allocation of the physical sidelink shared channel (PSSCH) and to decode the second stage SCI.

As for the second stage SCI with format 2-A and 2-B, it may be carried by PSSCH (multiplexed with SL-shared channel (SCH)). The second stage SCI may include source (Tx) and destination (Rx) identities. The second stage SCI may also include information to identify and decode the associated SL-SCH transport block (TB), and include control of hybrid automatic repeat request (HARQ) feedback in unicast/groupcast. Further, the second stage SCI may include a trigger for channel state information (CSI) feedback in unicast.

According to 3GPP, an NR SL relay may be provided to support coverage extension, considering wider range of usage including V2X, public safety, and commercial applications and services. That is, a UE that is not able to communicate directly with the NW or another UE (e.g., due to not being under coverage of the NW or another UE, or for power saving) may use another UE. The other UE in this case may correspond to a relay UE, and the relay UE may function as a hop to reach the NW or another UE.

Additionally, the NR SL relay may provide technical solutions for the SL relay using both Layer-2 based relay architecture and Layer-3 based relay architecture. However, the NR SL relay may only include limited features due to the lack of time. In particular, the NR SL relay at the time of this application may support only UE-to-network relay, and its service continuity solution may be limited to intra-gNB direct-to-indirect and indirect-to-direct path switching in the Layer-2 relay. 3GPP provides support of U2U relay for the SL coverage extension without relying on the use of uplink (UL) and downlink (DL). Thus, in principle, a Tx UE (e.g., source (SRC) UE) may use a UE as a relay to reach an Rx UE (e.g., destination (DST) UE). In some cases, the term single-hop U2U relay may be used when referring to the case where only one relay UE is used between the SRC UE and DST UE.

In a SL-based unicast communication, a SRC UE (Tx UE) and a DST UE (Rx UE) may use a direct SL communication path (i.e., direct path), when being in direct SL proximity of one another, or an indirect SL communication path (i.e., indirect path), via a U2U Relay UE when being out of direct SL proximity of one another. Thus, switching between the direct path and indirect path may be expected considering certain mobility or coverage scenarios of the SRC UE and DST UE. For example, the SRC UE may be moving in and out of a basement or a building with its holder (e.g., a public-safety officer) while communicating with the DST UE (e.g., a commander) outside a basement of the building, or outside the building in a public safety mission. In this scenario, the direct path may be applicable when both the SRC UE and the DST UE are out of the basement or building, otherwise the indirect path needs to be used.

To support switching between the direct path and indirect path, it may be possible to provide a way to trigger the switch at the SRC UE and DST UE. For a switch from the direct path to the indirect path, either the SRC UE or the DST UE may be able to detect that the received power of a respective SL communication signal between them drops below a configured threshold in order to trigger possible switch to the indirect path. However, when considering how to trigger a possible switch from the indirect path to the direct path, consideration may be made as to which of the SRC UE and DST UE needs to monitor what respective SL communication signal(s) for what reason and how in order to trigger a robust switch from the indirect path to the direct path.

In one solution, at least one of the SRC UE and the DST UE may be configured to probe one another for direct reachability periodically by sending a reference signal or a message over SL with a maximum allowed transmit power towards one another periodically while using the indirect path. However, such solution may require significant overhead in terms of resource consumption of UE power and radio resources when the SRC UE and the DST UE are not in proximity of one another while using the indirect path. Furthermore, the periodical transmission of such a "probing" signal or message with maximum allowed transmit power may cause interference to nearby UEs and should therefore be limited as much as possible. Thus, certain example embodiments described herein may provide options for supporting path switch from the indirect path to the direct path for the SRC UE and DST UE while communicating with one another via the U2U relay UE. In doing so, it may be possible to minimize overhead, interference, and standardization impact.

Figure 2:
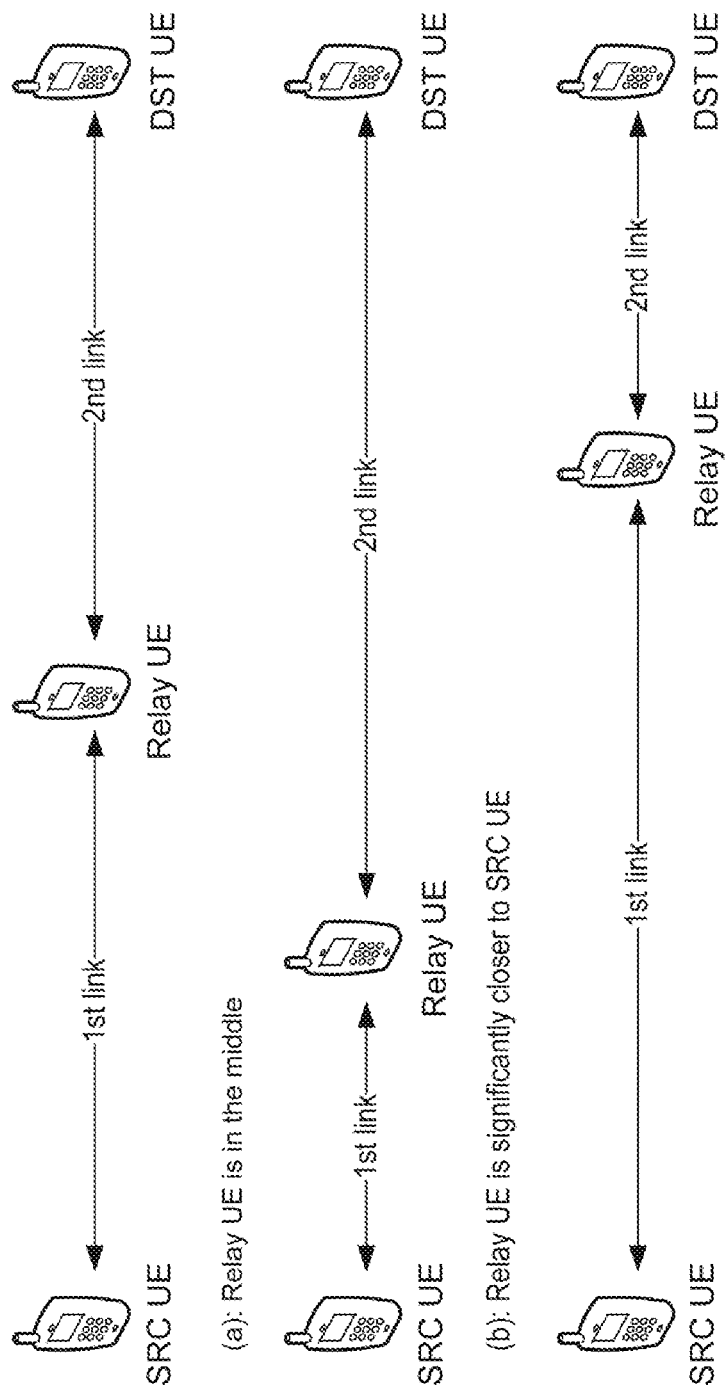
FIG. 2 illustrates an example of scenarios of an indirect path, according to certain example embodiments.
Figure 3:
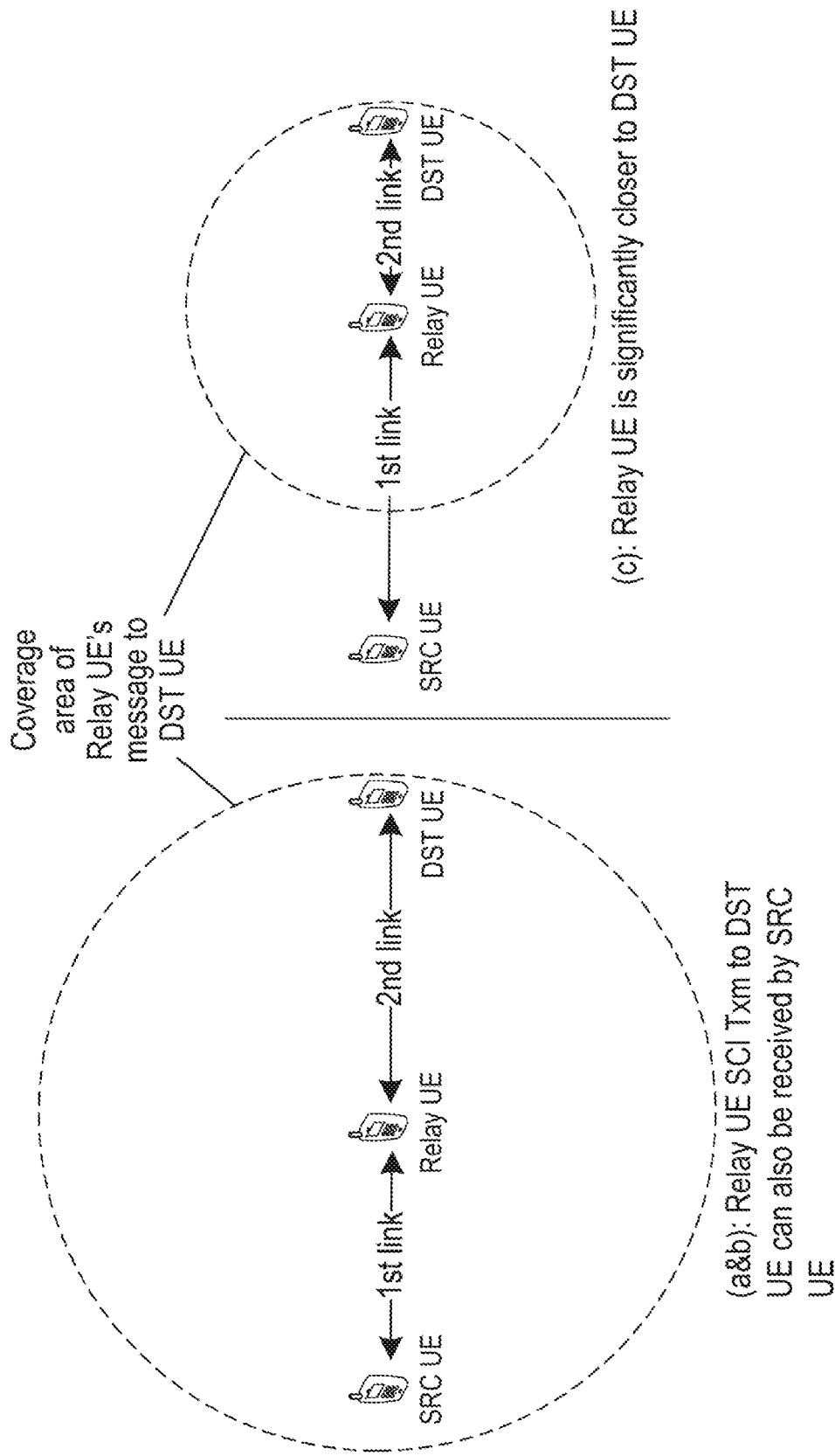
FIG. 3 illustrates an example coverage area of a sidelink control information (SCI) message from a relay user equipment (UE) toward a destination (DST) UE, according to certain example embodiments.

FIG. 2 illustrates an example of scenarios of an indirect path, according to certain example embodiments. As described herein, certain example embodiments may provide a solution on how a SRC UE and DST UE which are using an indirect path via a relay UE can identify a possibility to switch to direct SL communication with a limited impact on the SRC UE's and/or the DST UE's used power and signaling overhead as well as introduced interference to other nearby UEs. For instance, as illustrated in FIG. 2, there may be certain scenarios (i.e., the relay UE is in the middle, the relay UE is closer to the SRC UE, and the relay UE is closer to the DST UE) of the indirect path between the SRC UE and the DST UE via a serving U2U relay UE. In scenario (c) of FIG. 2, due to a possible use of transmit power control (TPC) over a unicast SL connection, the SRC UE may not be able to receive an SL signal such as SCI sent on PSCCH and PSSCH from the U2U relay UE towards the DST UE. In scenarios (a) and (b) of FIG. 2, the SRC UE may receive the SCI that the relay UE transmits to the DST UE, while the transmission from the relay UE to the DST UE may not reach the SRC UE in scenario (c). This example is illustrated in FIG. 3 where the coverage area of the SCI message from the relay UE toward the DST UE is indicated.

Figure 4:
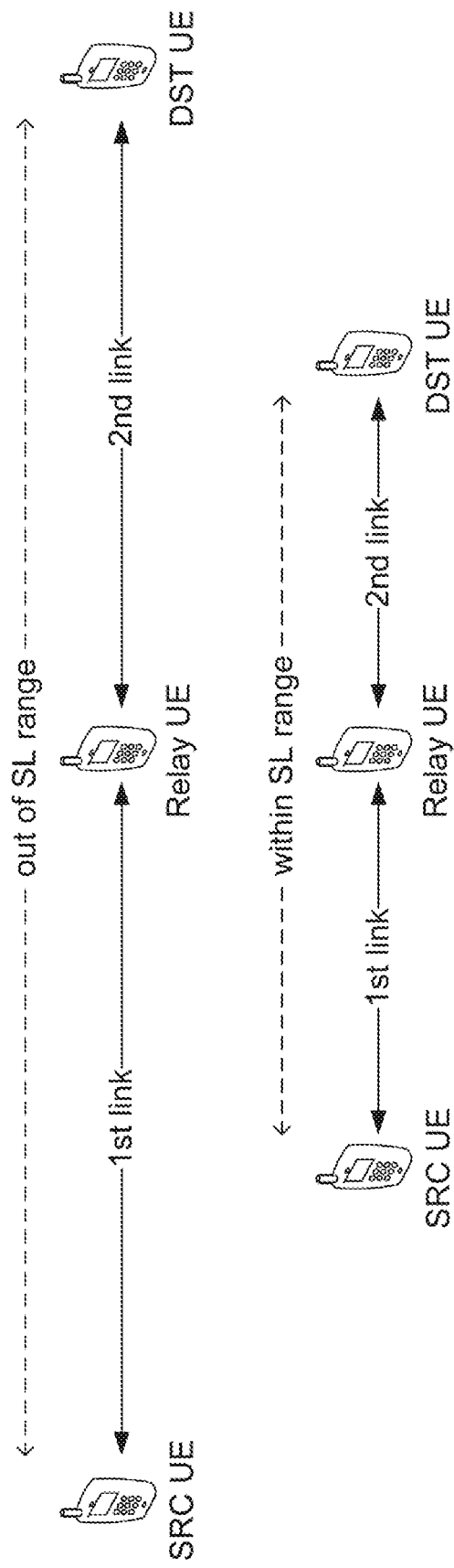
FIG. 4 illustrates an example of cases where source UEs and DST UEs can/cannot communicate directly, according to certain example embodiments.

In the scenarios (a) and (b) of FIG. 2, since the SRC UE may be able to estimate path-loss distance between the SRC UE and the relay UE based on its own transmit power level towards the relay UE (e.g., the higher the transmit power level the SRC UE needs to use for SL transmission towards the relay UE the higher or longer the path-loss distance between the SRC UE and the Relay UE), the SRC UE may be able to determine a probability that the DST UE may be in SL range of the SRC UE. According to certain example embodiments, the determination of the probability may be based on the received power level of the received SCI that is transmitted by the relay UE to the DST UE in comparison with the received power level of a respective SL signal transmitted by the relay UE to the SRC UE, provided with the transmit power level the SRC UE is using for SL transmission to the relay UE. That is, as the SRC UE may be able to estimate the path-loss distance between the SRC UE and the relay UE based on the transmit power level the SRC UE is using to transmit a respective signal or message to the relay UE and the received power level on a respective signal or message from the relay UE the SRC UE is receiving, the SRC UE may also able to estimate the path-loss distance between the relay UE and the DST UE based on the received power level on the SCI that is transmitted by the relay UE to the DST UE and received by the SRC UE. It is noted that the transmit power level the SRC UE is using for SL transmission towards the relay UE may reflect the path-loss distance between the SRC UE and the relay UE. Additionally, the transmit power level can be adapted by the SRC UE based on the received power level on a respective signal or message from the relay UE to the SRC UE due to transmit power control over unicast SL connection between the SRC UE and the relay UE. FIG. 4 illustrates an example of cases where the SRC UE and DST UE can/cannot communicate directly, according to certain example embodiments. In particular, FIG. 4 illustrates some path-loss examples that may be considered in the path switch.

Based on the above analyses as well as exploring possible uses of existing SL signals and messages for minimizing standardization impact, certain example embodiments may provide an efficient method for supporting path switch from the indirect path to the direct path for the SRC UE and DST UE while communicating with one another via the U2U Relay UE. In particular, according to certain example embodiments, the SRC UE, based on continuous SCI monitoring, may determine whether the SRC UE receives SCI that is transmitted by the relay UE to the DST UE (as expected in a U2U relay operation of the indirect path) sufficiently (i.e., the received SCI satisfies the configured conditions; received SCI may be decodable, and received power on the received SCI may be above a threshold at the SRC UE) according to configured conditions.

According to certain example embodiments, it may be assumed that L2 IDs of the U2U relay UE and the DST UE which are used as SRC ID and DST ID as indicated in SCI from the U2U relay UE to the DST UE are known to the SRC UE (e.g., from the setup of the indirect path). That is, L2 IDs of the respective SRC UE, DST UE, and relay UE may be signaled and maintained between the SRC UE, the DST UE, and the relay UE for the U2U relay connection setup and maintenance for the indirect path. Thus, the SRC UE may be able to determine which SCI among the SCI received (and decoded successfully) at the SRC UE is transmitted by the relay UE to the DST UE. Additionally, in certain example embodiments, the SRC UE may determine that it receives SCI that is transmitted by the relay UE to the DST UE sufficiently if the following conditions are met: (i) the SRC UE receives at least one SCI that is sent from the relay UE to the DST UE within a monitoring time window; and (ii) the received power (RxPw) level on the received at least one SCI is above a first RxPw threshold (e.g., in scenario (b) and some cases of scenario (a) in FIG. 2). Otherwise, the SRC UE may determine that it does not receive the SCI that is transmitted by the relay UE to the DST UE sufficiently (e.g., in scenario (c) and some cases of scenario (a) in FIG. 2). In some example embodiments, as the SRC UE performs continuous SCI monitoring, if the SRC UE receives an SCI sent by the DST UE directly and sufficiently such that the received power level on the received SCI from the DST UE is above a threshold (i.e., configured RxPw threshold), the SRC UE may initiate a path switch from the indirect path to the direct path with the DST UE.

In certain example embodiments, the monitoring time window may be set by the SRC UE in dependence on the end-to-end packet delay budget of data traffic the SRC UE is transmitting to the DST UE via the relay UE (e.g., one or multiple thereof), according to configuration from the serving network of the SRC UE. In a simpler option, a semi-static time duration may be configured or set for the monitoring time window. However, in some example embodiments, a determination of which option to be used and constraint(s) thereof may be configured or preconfigured to the SRC UE by its serving network, or left for UE implementation at the SRC UE.

According to certain example embodiments, the first RxPw threshold may be set by the SRC UE in dependence on at least one of the received power level at the SRC UE on SL transmission from the relay UE to the SRC UE, and the transmit power level the SRC UE is using for SL transmission to the relay UE, according to configuration from the serving network of the SRC UE. The received power level and the transmit power level may reflect the path loss distance between the SRC UE and the relay UE. In another example embodiment, a semi-static power level may be configured or set for the first RxPw threshold. However, a determination of which option to be used and constraint(s) thereof may be configured or preconfigured to the SRC UE by its serving network, or left for UE implementation at the SRC UE.

In certain example embodiments, when the SRC UE determines that it does not receive SCI that is transmitted by the relay UE to the DST UE sufficiently, the SRC UE may perform at least one of further determining that it does not need to perform any action to facilitate a possible path switch, transmitting its own SCI to the relay UE primarily for SL transmission of data traffic to the relay UE to be relayed to the DST UE by the relay UE and secondarily for aiming towards the DST UE, or periodically transmitting a SL message to the DST UE directly. Details of these options are described below.

As described above, in some example embodiments, the SRC UE may determine that it may not need to perform any action to facilitate a possible path switch. For example, this may occur when the SRC UE does not receive any SCI transmitted by the relay UE to the DST UE within the monitoring time window (implying that the SRC UE is considerably farther from the relay UE than the DST UE, as illustrated in scenario (c) of FIG. 2), and/or the transmit power level the SRC UE is using for SL transmission to the relay UE is above a first TxPw threshold (implying that the path-loss distance between the SRC UE and the relay UE is approaching an upper limit of the direct SL range and therefore the SRC UE and the DST UE are likely out of the direct SL range).

In other example embodiments, when the SRC UE determines that it does not receive the SCI that was transmitted by the relay UE to the DST UE sufficiently such that some of the SCI may be received and decoded successfully within the monitoring time window, but the received power level on the received SCI may be below the first RxPw threshold and/or that the transmit power level the SRC UE is using for SL transmission to the relay UE is below the first TxPw threshold, the SRC UE may transmit its own SCI to the relay UE primarily for SL transmission of data traffic to be relayed by the relay UE to the DST UE but with a maximum allowed transmit power according to a predefined pattern such as every n-th SCI aiming towards the DST UE secondarily. In doing so, the DST UE may, based on SCI monitoring in regular SL operation, trigger a possible path switch in case the DST UE is able to receive SCI transmitted by the SRC UE to the relay UE. According to some example embodiments, the maximum allowed transmit power may be above the power level needed for SL transmission from the SRC UE to the relay UE, and within the power budget of the SRC UE, as determined by the SRC UE according to configuration from the serving network. In some example embodiments, the transmitting of the SCI with the maximum allowed transmit power for the triggering of path switch may not be in line with the power control specified for unicast SL. Thus, in certain example embodiments, the relay UE may be made aware of the use of this option so that it will not adjust its Tx power towards the SRC UE based on receiving the n-th SCI transmitted with the maximum allowed transmit power from the SRC UE. In some example embodiments, this option may be desirable when the SRC UE frequently transmits data to the DST UE via the relay UE.

In further example embodiments, when the SRC UE determines that it does not receive the SCI that was transmitted by the relay UE to the DST UE sufficiently such that some of the SCI may be received and decoded successfully within the monitoring time window, but the received power level on the received SCI may be below the first RxPw threshold and/or that the transmit power level the SRC UE is using for SL transmission to the relay UE may be below the first TxPw threshold, the SRC UE may periodically transmit a SL message such as reusing discovery announcement, direct communication request (DCR), or SL channel state information (CSI) request sent in SCI and medium access control control element (MAC CE), or reusing "keep-alive" PC5-S signaling message to the DST UE directly using a maximum allowed transmit power while using the indirect path. Performing this action may allow the DST UE to trigger possible path switch when the DST UE is able to receive the SL message or at least the SCI thereof directly from the SRC UE (or help the SRC UE to trigger possible path switch based on response from the DST UE if received by the SRC UE). This option does not affect the power control over the unicast SL connection between the SRC UE and the relay UE. In certain example embodiments, this option may be used when the SRC UE infrequently transmits data to the DST UE via the relay UE.

According to certain example embodiments, the SRC UE may duplicate the periodic PC5-S signaling message (e.g., keep-alive message) transmission to the relay UE and the DST UE. The duplicated transmission to the DST UE may use a maximum allowed transmit power, and the duplication may be enabled using packet data convergence protocol (PDCP) duplication at least for the L2 U2U relay. In this case, the default configuration of the lower layer protocol (e.g., radio link control (RLC), MAC, and physical (PHY) layer) may be used for duplicated transmission between the SRC UE and the DST UE directly.

In certain example embodiments, when the SRC UE determines that it receives SCI that is transmitted by the relay UE to the DST UE sufficiently as described above, the SRC UE may perform at least one of determining that it does not need to perform any action to facilitate a possible path switch, monitoring HARQ feedback sent on a physical sidelink feedback channel (PSFCH) from the DST UE to the relay UE, or performing at least one of transmitting its own SCI to the relay UE for SL transmission primarily and towards the DST UE secondarily, or periodically transmitting a SL message such as reusing discovery announcement, DCR, or SL CSI request sent in SCI and MAC CE or reusing "keep-alive" PC5-S signaling message as described above.

As noted above, when the SRC UE receives the SCI that is transmitted by the relay UE to the DST UE (i.e., since the SCI is broadcast, the SRC UE may monitor and receive such SCI), the SRC UE may determine that it does not need to perform any action to facilitate a possible path switch. For example, this determination may be made when the SRC UE further determines that the received power level on the received SCI is above a second RxPw threshold and is larger than the first RxPw threshold (implying that the SRC UE is significantly closer to the relay UE than the DST UE as illustrated in scenario (b) of FIG. 2), and/or the transmit power level the SRC UE is using for SL transmission to the relay UE is above a second TxPw threshold (implying that the path-loss distance between the SRC UE and the relay UE is still high and therefore the SRC UE and the DST UE are likely out of the direct SL range).

As also noted above, the SRC UE may monitor HARQ feedback from the DST UE to the relay UE. For instance, according to certain example embodiments, when the received SCI that is transmitted from the relay UE to the DST UE indicates that SL HARQ with feedback is used between the relay UE and the DST UE, the SRC UE may monitor HARQ feedback sent on PSFCH from the DST UE to the relay UE for respective HARQ transmission, according to a configured pattern. In some example embodiments, the PSFCH resource used for sending the HARQ feedback by the DST UE to the relay UE may be derived from the resource allocation used for transmitting the respective HARQ transmission by the SRC UE, besides the DST UE, as indicated in the SCI of the respective HARQ transmission from the relay UE to the DST UE.

Based on whether HARQ feedback from the DST UE to the relay UE is received or not and the received power level on the received HARQ feedback at the SRC UE, the SRC UE may trigger a possible path switch between the SRC UE and the DST UE. For instance, if the received power level on the received HARQ feedback is above a third RxPw threshold, the SRC UE may initiate a direct path-switch request to the DST UE (e.g., request sent via the relay UE to the DST UE). In other example embodiments, the SRC UE may initiate a direct DCR to the DST UE to establish a direct unicast SL connection with the DST UE, and then communicate further with the DST UE for path-switch over the direct SL connection. Additionally, in some example embodiments, both the direct path and the indirect path may be kept and used for a transition period to avoid a ping-pong effect. The option of using DCR may imply that the non-access-stratum layer (PC5-S) above the access layer needs to be involved. Further, when the SRC UE performs at least one of transmitting its own SCI to the relay UE primarily, and towards the DST UE secondarily or periodically transmitting a SL message to the DST UE directly, the request may be initiated by the DST UE when the DST UE receives the SCI or the message from the SRC UE.

According to certain example embodiments, this option of the SRC UE monitoring HARQ feedback from the DST UE to the relay UE may be considered as an alternative or an addition to the SRC UE transmitting its own SCI to the relay UE for SL transmission of data traffic to the relay UE to be relayed to the DST UE primarily and aiming towards the DST UE secondarily or periodically transmitting a SL message to the DST UE directly described above. In other example embodiments, this option of the SRC UE monitoring HARQ feedback from the DST UE to the relay UE may be used alone when the SRC UE transmits data to the DST UE via the relay UE frequently or together with other options when the SRC UE transmits data to the DST UE via the relay UE infrequently. The relay UE may also need to be made aware of the use of this option so that it will not adjust its Tx power towards the DST UE based on receiving HARQ feedback transmitted with a maximum allowed power from the DST UE, as described further below.

As further noted above, when the SRC UE determines that it receives SCI that is transmitted by the relay UE to the DST UE, the received SCI may indicate that SL HARQ with feedback is not used between the relay UE and the DST UE. When this occurs, the SRC UE may perform at least one of transmitting its own SCI to the relay UE primarily and towards the DST UE secondarily or periodically transmitting a SL message to the DST UE directly, as described in the examples above. In certain example embodiments, the options of transmitting its own SCI and periodically transmitting a SL message may be additions or alternatives to the option of monitoring HARQ feedback, that is, performing at least one of transmitting its own SCI to the relay UE primarily and towards the DST UE secondarily or periodically transmitting a SL message to the DST UE directly.

According to certain example embodiments, the configuration of the conditions and constraints described above for the actions performed by the SRC UE, as well as patterns for transmitting and monitoring steps described above from serving network to the SRC UE and DST UE may be based on common signaling (e.g., system information block (SIB)) and dedicated signaling for in-coverage operation or pre-configuration for out-of-coverage operation. Furthermore, a first set of conditions (i.e., related to when the SRC UE determines to perform at least one of transmitting its own SCI to the relay UE primarily and towards the DST UE secondarily or periodically transmitting a SL message to the DST UE directly) and a second set of conditions (i.e., related to when the SRC UE determines to perform monitoring HARQ feedback from the DST UE to the relay UE) may be used for triggering an indication from the SRC UE to the DST UE on what to be expected as well as to trigger the DST UE to get involved, as further described below.

In certain example embodiments, the first set of conditions and the second set of conditions may not only relate or correspond to, for example, the TxPw and RxPw thresholds provided above, but also to, for example, whether HARQ with feedback is used or not between the relay UE and the DST UE, how often the data transmissions from the SRC UE to the DST UE via the relay UE are, and coordination between the SRC and DST UEs.

According to certain example embodiments, the TxPw and RxPw thresholds may be introduced for the SRC UE to decide whether or not to transmit the SL message (e.g., DCR or SL CSI request MAC CE), or monitor HARQ feedback to reduce overhead. Thus, in certain example embodiments, these thresholds may be considered as a common part of both the first and second sets of conditions. In other example embodiments, the TxPw and RxPw thresholds may be used for the SRC UE to determine how likely the SRC UE may be in a direct coverage range of the DST UE in order to trigger the transmitting step or the monitoring step, or both.

In certain example embodiments, a first message, such as SL discovery message or direct communication request or CSI request MAC CE, may be sent from the SRC UE to the DST UE periodically according to a first pattern while the SRC UE and the DST UE are communicating with one another using the indirect path. In other example embodiments, a second message may be based on utilizing the SCI of SL transmissions of data from the SRC UE to the relay UE to be relayed towards the DST UE. In some example embodiments, the SCI may be transmitted with a maximum allowed Tx power and according to a second pattern such as every n-th SCI or SL transmission from the SRC UE to the relay UE. This SCI may primarily be for SL transmission from the SRC UE to the relay UE, and secondarily aiming towards the DST UE. In some example embodiments, the second message may be a SL message from the SRC UE to the relay UE which is not to be relayed to the DST UE. This SL message may be a designated SCI in combination with a MAC CE for the SRC UE to probe the DST UE periodically while using the indirect path via the relay UE. The SCI of this SL message may be transmitted by the SRC UE with a maximum allowed transmit power. The relay UE, upon receiving this SL message from the SRC UE, may ignore this SL message.

As described above, the SRC UE may monitor HARQ feedback (i.e., SL feedback) from the DST UE. In certain example embodiments, the SL feedback to be monitored by the SRC UE may be based on utilizing the HARQ feedback from the DST UE to the relay UE transmitted with a maximum allowed Tx power and according to a third pattern. This option may be similar to utilizing the SCI but transmitted by the DST UE and monitored by the SRC UE. According to certain example embodiments, use of SL feedback monitoring may be triggered by the SRC UE to the DST UE. That is, the SRC UE may be responsible for determining that the second set of conditions is met, and then indicating that to the DST UE to activate this option.

Figure 5:
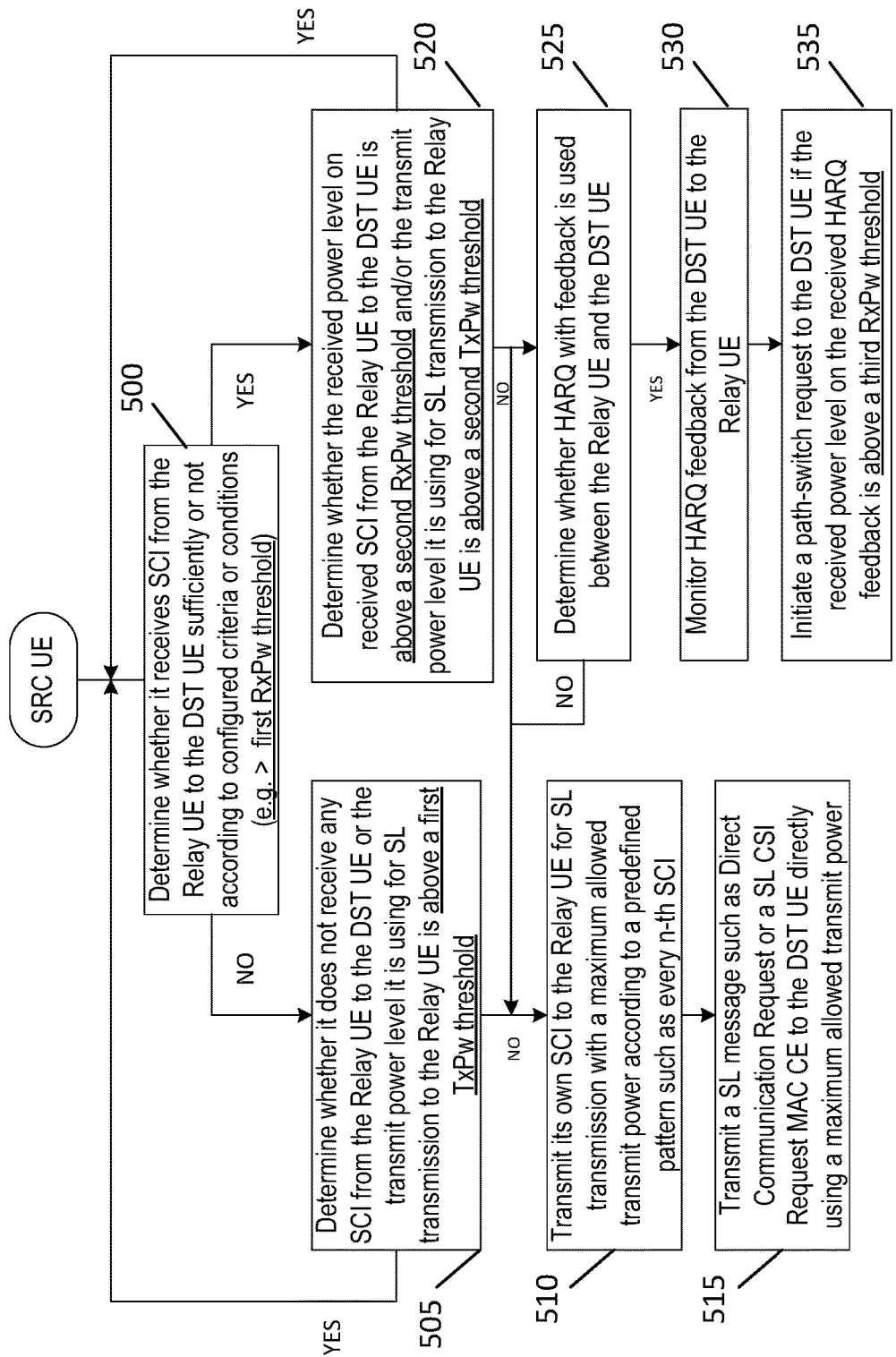
FIG. 5 illustrates an example flow diagram of operations performed at by a source (SRC) UE, according to certain example embodiments.

FIG. 5 illustrates an example flow diagram of operations performed by the SRC UE, according to certain example embodiments. At operation 500, the SRC UE may determine whether it receives SCI from the relay UE to the DST UE according to configured criteria or conditions (e.g., the received power level of the SCI is above a first RxPw threshold). If the SRC UE does not receive the SCI according to the configured criteria or conditions, at operation 505, the SRC UE may determine if it does not receive any SCI from the relay UE to the DST UE within a monitoring time window, or the transmit power level it is using for SL transmission to the relay UE is above a first TxPw threshold. At operation 510, if the SRC UE determines that it does not receive any SCI from the relay UE to the DST UE within the monitoring time window, or that the transmit power level for SL transmission from the SRC UE to the relay UE is not above the first TxPw threshold, the SRC UE may transmit its own SCI to the relay UE for SL transmission of data to be relayed to the DST UE with a maximum allowed transmit power according to a predefined pattern such as, for example, every n-th SCI. At operation 515, the SRC UE may transmit a SL message such as, for example, DCR or a SL CSI request MAC CE to the DST UE directly using a maximum allowed transmit power. The operation 515 may be performed in addition to or instead of the operation 510.

As further illustrated in FIG. 5, when the SRC UE determines that it receives SCI from the relay UE to the DST UE according to the configured criteria or conditions, at operation 520, the SRC UE may determine if the received power level on the received SCI from the relay UE to the DST UE is above a second RxPw threshold, and/or the transmit power level it is using for SL transmission to the relay UE is above a second TxPw threshold. If the result at operation 520 is no, then, at operation 525, the SRC UE may determine whether HARQ with feedback is used between the relay UE and the DST UE. If the SRC UE determines that HARQ with feedback is used, at operation 530, the SRC UE may monitor HARQ feedback from the DST UE to the relay UE. Further, at operation 535, the SRC UE may initiate a path-switch request to the DST UE if the received power level on the received HARQ feedback is above a third RxPw threshold.

With reference to FIG. 5, in certain example embodiments, operations 510 and/or 515 may be performed before or after operation 525. Additionally, the SRC UE may be configured to adapt whether to perform either or both the transmitting in operations 510 and/or 515, and/or the monitoring in operation 530 when respective conditions are met. The SRC UE may also be configured to adapt the transmitting pattern including the maximum allowed transmit power for transmitting its own SCI to the relay UE or the SL message to the DST UE, and/or the monitoring pattern for monitoring HARQ feedback from the DST UE to the relay UE. In certain example embodiments, these adaptations may be based on measurements at the SRC UE on received SCI from the relay UE, channel busy ratio (CBR) over a selected Tx resource pool, priority, and other QoS requirements of the data traffic between the SRC UE and the DST UE.

According to other example embodiments, after operation 520, if the SRC UE determines that the DST UE may be close enough to the SRC UE, the SRC UE may opt for the transmitting in operations 510 and/or 515 rather than the monitoring in operation 530. In this case, the SRC UE may use the maximum allowed Tx power adjusted based on the determination of necessary transmit power to reach the DST UE on the ground of determining conditions in operation 520. In other example embodiments, when CBR is high, the SRC UE may prioritize the monitoring in operation 530 over the transmitting in operations 510 and/or 515. In yet another example embodiment, when the traffic is highly delay sensitive with high priority, the SRC UE may perform all the transmitting in operations 510 and/or 515, and the monitoring in operation 530 when respective conditions are met. Thus, in some example embodiments, CBR conditions, QoS requirements, and/or data traffic patterns such as how often the SRC UE transmits data to the DST UE can be considered as part of the first set of conditions and/or the second set of conditions. In some example embodiments, the first set of conditions may be a subset of the second set of conditions.

In certain example embodiments, both the SRC UE and the DST UE may be configured by the serving NW to perform the operations described above in a bidirectional SL communication when acting as Tx UE or SRC UE for a respective direction. In other example embodiments, the SRC UE and the DST UE in a bidirectional SL communication may be configured by the serving network to determine independently at the SRC UE and the DST UE whichever of the SRC UE and the DST UE that is closer or has lower or shorter path-loss distance towards the relay UE to perform the operations described above. In certain example embodiments, the operations may be performed when the SRC UE or the DST UE acts as Tx UE (i.e., the SRC UE) for a respective direction in a bidirectional communication. To ensure that at least one of the SRC UE and the DST UE when acting as Tx UE for respective direction in a bidirectional communication will perform the operations, a robust offset may be configured to allow the SRC UE and DST UE, when acting as Tx UE for respective direction in a bidirectional communication, to determine whether a difference between the received power level on the received SCI that is transmitted from the relay UE to the SRC UE and the received power level on the received SCI that is transmitted from the relay UE to the DST UE is above the offset. According to certain example embodiments, this determination may be performed by the SRC UE and the DST UE in a bidirectional communication to determine whether the SRC UE and the DST UE (when acting as Tx UE) need to perform the operations described above.

According to certain example embodiments, the relay UE may determine the transmit power needed to reach the SRC UE and DST UE, and may evaluate the possibility for the SRC UE and the DST UE to communicate directly and trigger either of the SRC UE or DST UE to switch to direct path or to perform the transmitting and/or monitoring operations described above. In certain example embodiments, this determination may be based on determining that the sum of TxPw-SRC (Tx power needed to reach the SRC UE), and TxPw-DST (Tx power needed to reach the DST-UE) is less than a third TxPw threshold. The third TxPw threshold may be set to a maximum allowed transmit power plus or minus an offset.

In other example embodiments, when the SRC UE determines that the conditions for monitoring HARQ feedback from the DST UE to the relay UE are met (see operations 520 and 525 in FIG. 5), the SRC UE may send an indication to the DST UE via the relay UE. This indication may be used for triggering the DST UE to transmit HARQ feedback to the relay UE on PSFCH with a maximum allowed power according to a pattern. For example, the pattern may be configured for an upcoming HARQ process, or for a configured time interval starting from the time instant the indication from the SRC UE is received. In other example embodiments, the pattern may be configured for all HARQ feedback of the upcoming HARQ process or up to a configured maximum number of HARQ feedbacks within the configured time interval. Thus, certain example embodiments may further enhance the scheme with minimized overhead in term of transmit power for the DST UE. Certain example embodiments may also be applicable during unidirectional data communication from the SRC UE to the DST UE.

It may be noted that in some example embodiments, the SRC UE may monitor HARQ feedback from the DST UE to the relay UE when the conditions for monitoring HARQ feedback from the DST UE to the relay UE are met, regardless of knowing or not knowing the transmission pattern of HARQ feedback from the DST UE. Thus, the monitoring pattern of the SRC UE may or may not correspond to or depend on the transmission pattern of the DST UE. In other example embodiments, the maximum allowed transmit power may be considered as part of the transmission pattern.

Figure 6:
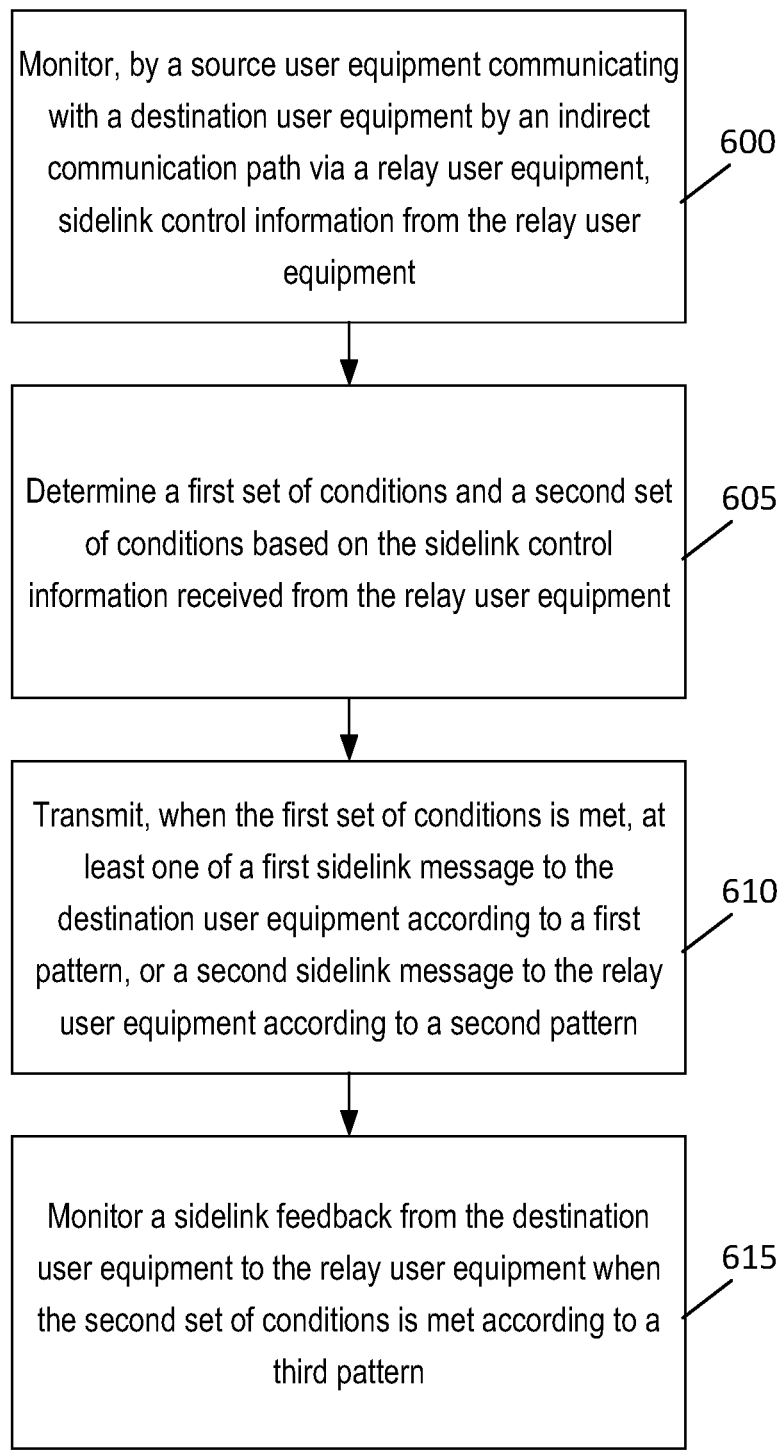
FIG. 6 illustrates an example flow diagram of another method, according to certain example embodiments.

FIG. 6 illustrates an example flow diagram of a method, according to certain example embodiments. In an example embodiment, the method of FIG. 6 may be performed by a network entity, or a group of multiple network elements in a 3GPP system, such as LTE or 5G-NR. For instance, in an example embodiment, the method of FIG. 6 may be performed by a UE or SRC UE similar to one of apparatuses 10 or 20 illustrated in FIG. 7.

According to certain example embodiments, the method of FIG. 6 may include, at 600, monitoring, by a source user equipment communicating with a destination user equipment by an indirect communication path via a relay user equipment, sidelink control information from the relay user equipment. The method may also include, at 605, determining a first set of conditions and a second set of conditions based on the sidelink control information received from the relay user equipment. The method may further include, at 610, transmitting, when the first set of conditions is met, at least one of a first sidelink message to the destination user equipment according to a first pattern, or a second sidelink message to the relay user equipment according to a second pattern. In addition, the method may include, at 615, monitoring a sidelink feedback from the destination user equipment to the relay user equipment when the second set of conditions is met according to a third pattern.

According to certain example embodiments, the determining of the first set of conditions and the second set of conditions may include a determination of whether the sidelink control information transmitted by the relay user equipment to the destination user equipment is received according to configured criteria comprising whether a received power level on the sidelink control information from the relay user equipment to the destination user equipment is above a first reception power threshold. The determining further include a determination of whether the source user equipment receives any sidelink control information transmitted by the relay user equipment to the destination user equipment within a configured monitoring time window, or a transmit power level for performing a sidelink transmission from the source user equipment to the relay user equipment is above a first transmit power threshold. The determining further includes a determination of at least one of whether a received power level on the sidelink control information from the relay user equipment to the destination user equipment is above a second reception power threshold, or a transmit power level for performing a sidelink transmission from the source user equipment to the relay user equipment is above a second transmit power threshold. According to some example embodiments, the determining of the second set of conditions may include a determination of whether hybrid automatic repeat request with feedback is used between the relay user equipment and the destination user equipment. In certain example embodiments, the method may further include initiating a path switch request to the destination user equipment when the received power level on the sidelink feedback from the destination user equipment to the relay user equipment is above a third reception power threshold. According to other example embodiments, the first sidelink message may include a discovery announcement, a direct communication request, a keep-alive message, or a sidelink channel state information request, and the first sidelink message may be transmitted directly to the destination user equipment. According to other example embodiments, the second sidelink message is sidelink control information for sidelink transmissions of data from the source user equipment to the relay user equipment wherein the data is to be relayed to the destination equipment. According to other example embodiments, the sidelink feedback is HARQ feedback from the destination user equipment to the relay user equipment.

In certain example embodiments, when at least one condition of the first set of conditions or the second set of conditions is met, the method may further include determining that the destination user equipment is out of a sidelink range of the source user equipment, and communicating with the destination user equipment by an indirect communication path via the relay user equipment without performing the transmitting of at least one of the first sidelink message to the destination user equipment according to the first pattern or the second sidelink message to the relay user equipment according to the second pattern or the monitoring of the sidelink feedback from the destination user equipment to the relay user equipment according to the third pattern. In some example embodiments, the second sidelink message may be transmitted to the relay user equipment with a maximum allowed transmit power. In other example embodiments, the maximum allowed transmit power may be an amount of power that is above a power level needed for transmitting the second sidelink message to the relay user equipment, and may be within a predefined power budget. In other example embodiments, the SRC UE may send an indication to the DST UE via the relay UE at least when the second set of conditions is met indicating that the source UE is performing the monitoring of the SL feedback from the DST UE to the relay UE (to trigger the DST UE to transmit the SL feedback according to a pattern which may be the same or different from the third pattern).

Figure 7:
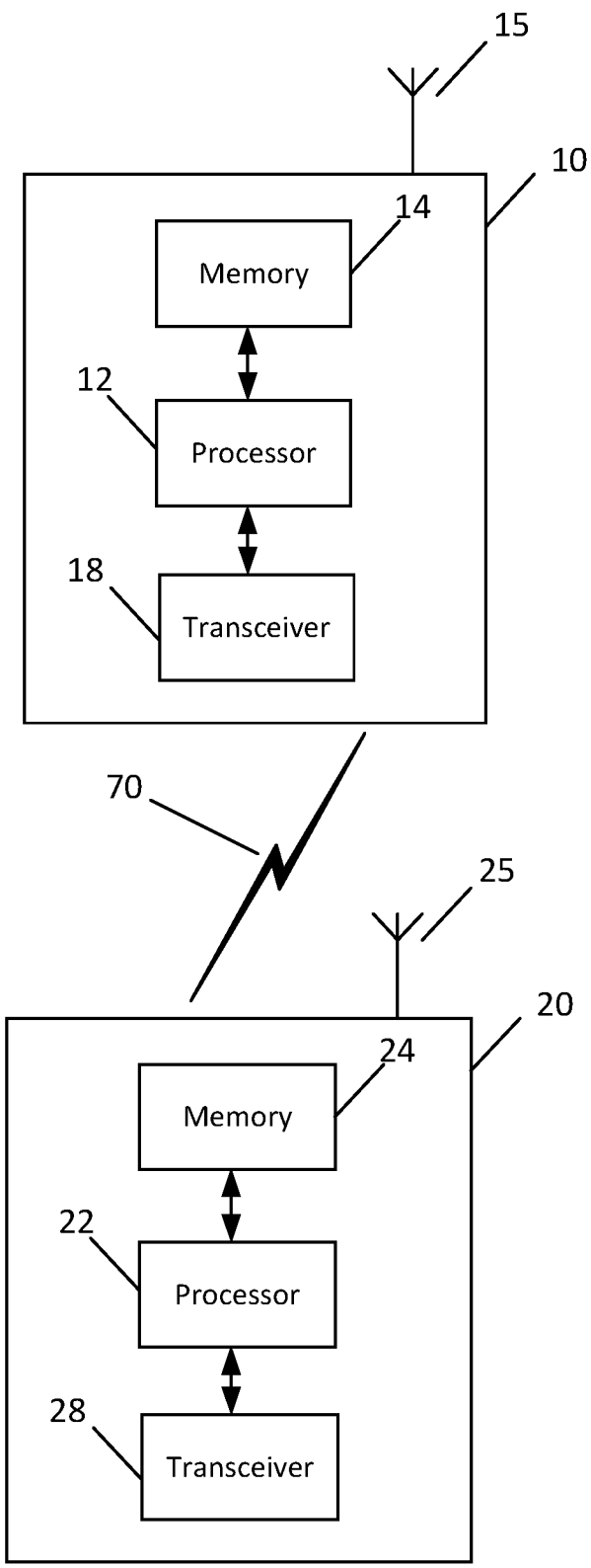
FIG. 7 illustrates a set of apparatuses, according to certain example embodiments.

FIG. 7 illustrates a set of apparatuses 10 and 20 according to certain example embodiments. In certain example embodiments, the apparatus 10 may be an element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 7.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 7, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes and examples illustrated in FIGS. 1-6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods and examples illustrated in FIGS. 1-6.

In some example embodiments, apparatus 10 may also include or be coupled to one or more antennas 15 for receiving a downlink signal and for transmitting via an UL from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digitalto-analog converters and the like), symbol demappers, signal shaping components, an Inverse Fast Fourier Transform (IFFT) module, and the like, to process symbols, such as OFDMA symbols, carried by a downlink or an UL.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to monitor sidelink control information from the relay user equipment, wherein the apparatus is in communication with a destination user equipment by an indirect communication path via a relay user equipment. Apparatus 10 may also be controlled by memory 14 and processor 12 to determine a first set of conditions and a second set of conditions based on the sidelink control information received from the relay user equipment. Apparatus 10 may further be controlled by memory 14 and processor 12 to transmit, when the first set of conditions is met, at least one of a first sidelink message to the destination user equipment according to a first pattern, or a second sidelink message to the relay user equipment according to a second pattern. In addition, apparatus 10 may be controlled by memory 14 and processor 12 to monitor a sidelink feedback from the destination user equipment to the relay user equipment when the second set of conditions is met according to a third pattern.

As illustrated in the example of FIG. 7, apparatus 20 may be a network, core network element, or element in a communications network or associated with such a network, such as a gNB, or NW. It should be noted that one of ordinary skill in the art would understand that apparatus 20 may include components or features not shown in FIG. 7.

As illustrated in the example of FIG. 7, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes and examples illustrated in FIGS. 1-5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods and examples illustrated in FIGS. 1-5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an UL).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for monitoring sidelink control information from the relay user equipment, wherein the apparatus is in communication with a destination user equipment by an indirect communication path via a relay user equipment. The apparatus may also include means for determining a first set of conditions and a second set of conditions based on the sidelink control information received from the relay user equipment. The apparatus may further include means for transmitting, when the first set of conditions is met, at least one of a first sidelink message to the destination user equipment according to a first pattern, or a second sidelink message to the relay user equipment according to a second pattern. In addition, the apparatus may include monitoring a sidelink feedback from the destination user equipment to the relay user equipment when the second set of conditions is met according to a third pattern.

Certain example embodiments described herein provide several technical improvements, enhancements, and/or advantages. For instance, in some example embodiments, it may be possible to configure triggers for a path switch from an indirect path to a direct path between an SRC UE and a DST UE in an efficient and robust manner with minimum standardization impact and overhead. According to other example embodiments, it may also be possible to provide support for effective unidirectional and bidirectional data communications between the SRC UE and the DST UE. Additionally, certain example embodiments may minimize transmit power for the DST UE.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation

5GCN 5G Core Network
5GS 5G System
BS Base Station
CBR Channel Busy Ratio
DCI Downlink Control Information
DL Downlink
DST Destination
eNB Enhanced Node B
E-UTRAN Evolved UTRAN
FC Flow control
gNB 5G or Next Generation NodeB
HARQ Hybrid Automatic Repeat Request
InS In Synch
IUC Inter-UE Coordination
LTE Long Term Evolution
MCS Modulation and Coding Scheme
NR New Radio
NW Network
PDB Packet Delay Budget
PSCCH Physical Sidelink Control Channel
PSSCH Physical Sidelink Shared Channel
QoS Quality of Service
RRC Radio Resource Control
SCI Sidelink Control Information
SL Sidelink
SIB System Information Block
SRC Source
TB Transport Block
TBS Transport Block Size
TPC Transmit Power Control
U2N UE to Network
U2U UE to UE
UAI UE Assistance Information
UE User Equipment
UL Uplink

We claim:

1. An apparatus, comprising:
at least one processor; and
at least one memory comprising computer program code, the at least one memory and the computer program code configured to, with the at least one processor to cause the apparatus at least to
monitor sidelink control information from a relay user equipment, wherein the apparatus is in communication with a destination user equipment by an indirect communication path via a relay user equipment;
determine a first set of conditions and a second set of conditions based on the sidelink control information received from the relay user equipment,
wherein the determination of the first set of conditions comprises a determination of whether the sidelink control information transmitted by the relay user equipment to the destination user equipment is received according to configured criteria comprising whether a received power level on the sidelink control information from the relay user equipment to the destination user equipment is above a first reception power threshold,
wherein the determination of the second set of conditions comprises whether a received power level on the sidelink control information from the relay user equipment to the destination user equipment is above a second reception power threshold, and whether a transmit power level for performing a sidelink transmission from a source user equipment to the relay user equipment is above a second transmit power threshold;
transmit, when the first set of conditions is met:
a first sidelink message to the destination user equipment according to a first pattern,
wherein the first sidelink message comprises a discovery announcement, a direct communication request, a keep-alive message, or a sidelink channel state information request, and
wherein the first sidelink message is transmitted directly to the destination user equipment, and
a second sidelink message to the relay user equipment according to a second pattern,
wherein the second sidelink message is sidelink control information for sidelink transmissions of data from the apparatus to the relay user equipment,
wherein the data is to be relayed to the destination user equipment,
wherein the second sidelink message is transmitted to the relay user equipment with a maximum allowed transmit power, and
wherein the maximum allowed transmit power is an amount of power that is above a power level needed for transmitting the second sidelink message to the relay user equipment, and is within a predefined power budget,
wherein the first set of conditions is met when the received power level on the sidelink control information from the relay user equipment to the destination user equipment is above the first reception power threshold;
monitor a sidelink feedback from the destination user equipment to the relay user equipment when the second set of conditions is met according to a third pattern,
wherein the second set of conditions is met when the received power level on the sidelink control information from the relay user equipment to the destination user equipment is above the second reception power threshold and the transmit power level for performing a sidelink transmission from the source user equipment to the relay user equipment is above the second transmit power threshold, and
wherein the sidelink feedback is hybrid automatic repeat request feedback from the destination user equipment to the relay user equipment; and
initiate a path switch request to the destination user equipment when the received power level on the sidelink feedback from the destination user equipment to the relay user equipment is above a third reception power threshold.

* * * * *